(12) United States Patent
Clum et al.

(10) Patent No.: US 10,767,509 B2
(45) Date of Patent: Sep. 8, 2020

(54) TRIP STRIP AND FILM COOLING HOLE FOR GAS TURBINE ENGINE COMPONENT

(71) Applicant: United Technologies Corporation, Farmington, CT (US)

(72) Inventors: Carey Clum, East Hartford, CT (US); Dominic J. Mongillo, Jr., West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 366 days.

(21) Appl. No.: 15/723,459

(22) Filed: Oct. 3, 2017

(65) Prior Publication Data

US 2019/0101021 A1 Apr. 4, 2019

(51) Int. Cl.
*F01D 25/12* (2006.01)
*F01D 9/04* (2006.01)
(Continued)

(52) U.S. Cl.
CPC ............ *F01D 25/12* (2013.01); *F01D 5/186* (2013.01); *F01D 9/041* (2013.01); *F01D 9/065* (2013.01); *F05D 2220/32* (2013.01); *F05D 2230/21* (2013.01); *F05D 2230/31* (2013.01); *F05D 2240/11* (2013.01); *F05D 2240/35* (2013.01); *F05D 2250/75* (2013.01);
(Continued)

(58) Field of Classification Search
None
See application file for complete search history.

(56) References Cited

U.S. PATENT DOCUMENTS

| 4,770,608 A | * | 9/1988 | Anderson | F01D 5/186 |
| | | | | 415/115 |
| 5,536,143 A | * | 7/1996 | Jacala | F01D 5/187 |
| | | | | 416/96 R |

(Continued)

FOREIGN PATENT DOCUMENTS

| EP | 1043479 A2 | 10/2000 |
| EP | 3179041 A1 | 6/2017 |

(Continued)

OTHER PUBLICATIONS

European Search Report Issued in EP Application No. 18198501.1, dated Mar. 6, 2019, 26 Pages.

*Primary Examiner* — Michael Lebentritt
(74) *Attorney, Agent, or Firm* — Cantor Colburn LLP

(57) ABSTRACT

A component for a gas turbine engine, includes an external surface bounding a hot gas path of the gas turbine engine, and a cooling passage configured to deliver a cooling airflow therethrough. The cooling passage includes an internal surface located opposite the external surface, together defining a component wall. A plurality of trip strip features are located along the internal surface having a trip strip height extending from the internal surface and a trip strip width extending along the internal surface in a flow direction of the cooling airflow through the cooling passage. A ratio of a trip strip pitch between adjacent trip strip features in a width direction and the trip strip height is less than 5. One or more cooling film bleed holes extend from the internal surface to the external surface and are located between adjacent trip strip features of the plurality of trip strip features.

20 Claims, 6 Drawing Sheets

(51) Int. Cl.
*F01D 9/06* (2006.01)
*F01D 5/18* (2006.01)

(52) U.S. Cl.
CPC .. *F05D 2260/201* (2013.01); *F05D 2260/202* (2013.01); *F05D 2260/2212* (2013.01)

(56) References Cited

U.S. PATENT DOCUMENTS

| | | |
|---|---|---|
| 6,474,947 B1 | 11/2002 | Yuri |
| 7,544,044 B1* | 6/2009 | Liang .................... F01D 5/188 |
| | | 416/96 R |
| 2012/0082567 A1* | 4/2012 | Tibbott .................. F01D 5/186 |
| | | 416/97 R |
| 2015/0016947 A1 | 1/2015 | Kwon |
| 2015/0377029 A1 | 12/2015 | Blake et al. |
| 2017/0167268 A1* | 6/2017 | Bunker .................. F01D 25/12 |

FOREIGN PATENT DOCUMENTS

| | | |
|---|---|---|
| EP | 3181822 A1 | 6/2017 |
| JP | 2006214324 A | 8/2006 |

* cited by examiner

TRIP STRIP AND FILM COOLING HOLE FOR GAS TURBINE ENGINE COMPONENT

BACKGROUND

Exemplary embodiments pertain to the art of gas turbine engines, and more particularly to cooling of gas turbine engine components.

Gas turbines hot section components, for example, turbine vanes and blades and blade outer air seals, inner and outer end walls, combustor panels and other components of the gas turbine engine are configured for use within particular temperature ranges. Often, the conditions in which the components are operated exceed a maximum useful temperature of the material of which the components are formed. Thus, such components often rely on cooling airflow to cool the components during operation. For example, stationary turbine vanes often have internal passages for cooling airflow to flow through, and additionally may have openings in an outer surface of the vane for cooling airflow to exit the interior of the vane structure and form a cooling film of air over the outer surface to provide the necessary thermal conditioning. Similar internal cooling passages are often included in other components, such as the aforementioned turbine blades and blade outer air seals.

Trip strips are often included in the cooling passages, affixed to one or more walls of the cooling passage to increase turbulence of the cooling airflow flowing through the cooling passage, thereby improving heat transfer characteristics of the cooling passage. Currently, there is a limit on how closely spaced the trip strips can be before the heat transfer convective cooling effectiveness of the trip strips decreases. With reduced spacing between adjacent trip strip features, the thermal boundary layer separation and reattachment location no longer occurs between adjacent streamwise trip strip features. Experimental tests have been performed to measure and quantify the internal convective heat transfer augmentation and pressure loss characteristics associated with various trip strip arrays. Extensive design of experiments were performed to evaluate the impact of trip strip geometry shape, orientation, trip strip pitch, trips strip height, for various cooling passage geometries, aspect ratios, shapes, and orientations. Test results identified the optimal trip strip spacing and location of boundary layer reattachment necessary to achieve the highest internal convective heat transfer augmentation. As the streamwise distance between adjacent trips strips is reduced the boundary layer separation and reattachment location becomes sub-optimal in that the reattachment may occur at a location approximately coincident with the adjacent downstream trip strip location. In this respect the relative spacing of the trip strip geometry features has a significant impact on the local vorticities within the thermal boundary layer adjacent to the hot external wall. As the steam-wise trip strip spacing is reduced, the periodicity of the local flow field and subsequent near wall vortex structures associated with the "tripping" of the thermal boundary layer and subsequent flow separation and reattachment becomes compromised. In this sense, reduced streamwise trip strip spacing significantly weakens the near wall turbulence intensity and subsequently lowers the relative convective heat transfer augmentation achievable. In an effort to maximize convective heat transfer augmentation and internal rough wall surface area, it becomes desirable to reduce the streamwise spacing of the trip strip geometry features without compromising the optimal heat transfer augmentation and pressure loss.

BRIEF DESCRIPTION

In one embodiment, a component for a gas turbine engine, includes an external surface bounding a hot gas path of the gas turbine engine, and a cooling passage configured to deliver a cooling airflow therethrough. The cooling passage includes an internal surface located opposite the external surface, the internal surface and the external surface together defining a component wall. A plurality of trip strip features are located along the internal surface. Each trip strip feature has a trip strip height extending from the internal surface and a trip strip width extending along the internal surface in a flow direction of the cooling airflow through the cooling passage. A ratio of a trip strip pitch between adjacent trip strip features in a width direction and the trip strip height is less than 5. One or more cooling film bleed holes extend from the internal surface to the external surface. The one or more cooling film bleed holes are located between adjacent trip strip features of the plurality of trip strip features.

Additionally or alternatively, in this or other embodiments the ratio of trip strip pitch to trip strip height is between 2 and 4.

Additionally or alternatively, in this or other embodiments a trip strip feature of the plurality of trip strip features has an aspect ratio of trip strip height to trip strip width between 1 and 3.

Additionally or alternatively, in this or other embodiments the one or more cooling holes are positioned at a cooling hole distance from an upstream trip strip feature, wherein the cooling hole distance is between 0.5 and 3.5 times the trip strip height.

Additionally or alternatively, in this or other embodiments the one or more cooling film bleed holes are configured to divert a portion of the cooling airflow therethrough, to form a cooling film at the external surface.

Additionally or alternatively, in this or other embodiments the component is one of a turbine blade or a turbine vane of a gas turbine engine.

Additionally or alternatively, in this or other embodiments the component is formed via casting.

Additionally or alternatively, in this or other embodiments the plurality of trip strip features and the one or more cooling film bleed holes are formed concurrently using additive manufacturing ceramic core processes and/or fugitive core manufacturing processes.

In another embodiment, a turbine vane for a gas turbine engine includes an external surface bounding a hot gas path of the gas turbine engine. The external surface defines an airfoil portion of the vane. A cooling passage is configured to deliver a cooling airflow therethrough, and includes an internal surface located opposite the external surface, the internal surface and the external surface together defining a component wall. A plurality of trip strip features are located along the internal surface. Each trip strip feature has a trip strip height extending from the internal surface and a trip strip width extending along the internal surface in a flow direction of the cooling airflow through the cooling passage. A ratio of a trip strip pitch between adjacent trip strip features in a width direction and the trip strip height is less than 5. One or more cooling film bleed holes extend from the internal surface to the external surface. The one or more cooling film bleed holes are located between adjacent trip strip features of the plurality of trip strip features.

Additionally or alternatively, in this or other embodiments the ratio of trip strip pitch to trip strip height is between 2 and 4.

Additionally or alternatively, in this or other embodiments a trip strip feature of the plurality of trip strip features has an aspect ratio of trip strip height to trip strip width between 1 and 3.

Additionally or alternatively, in this or other embodiments the one or more cooling holes are positioned at a cooling hole distance from an upstream trip strip feature, wherein the cooling hole distance is between 0.5 and 3.5 times the trip strip height.

Additionally or alternatively, in this or other embodiments the one or more cooling film bleed holes are configured to divert a portion of the cooling airflow therethrough, to form a cooling film at the external surface.

Additionally or alternatively, in this or other embodiments the component is formed via casting.

Additionally or alternatively, in this or other embodiments the plurality of trip strip features and the one or more cooling film bleed holes are formed concurrently using additive manufacturing ceramic core processes and/or fugitive core manufacturing processes.

In yet another embodiment, a gas turbine engine includes a combustor section, a turbine section in flow communication with the combustor section, and one or more components including an external surface bounding a hot gas path of the gas turbine engine and a cooling passage configured to deliver a cooling airflow therethrough. The cooling passage includes an internal surface located opposite the external surface, the internal surface and the external surface together defining a component wall. A plurality of trip strip features are located along the internal surface. Each trip strip feature has a trip strip height extending from the internal surface and a trip strip width extending along the internal surface in a flow direction of the cooling airflow through the cooling passage. A ratio of a trip strip pitch between adjacent trip strip features in a width direction and the trip strip height is less than 5. One or more cooling film bleed holes extend from the internal surface to the external surface. The one or more cooling film bleed holes are located between adjacent trip strip features of the plurality of trip strip features.

Additionally or alternatively, in this or other embodiments the ratio of trip strip pitch to trip strip height is between 2 and 4.

Additionally or alternatively, in this or other embodiments a trip strip feature of the plurality of trip strip features has an aspect ratio of trip strip height to trip strip width between 1 and 3.

Additionally or alternatively, in this or other embodiments the one or more cooling holes are positioned at a cooling hole distance from an upstream trip strip feature, wherein the cooling hole distance is between 0.5 and 3.5 times the trip strip height.

Additionally or alternatively, in this or other embodiments the one or more cooling film bleed holes are configured to divert a portion of the cooling airflow therethrough, to form a cooling film at the outer surface.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
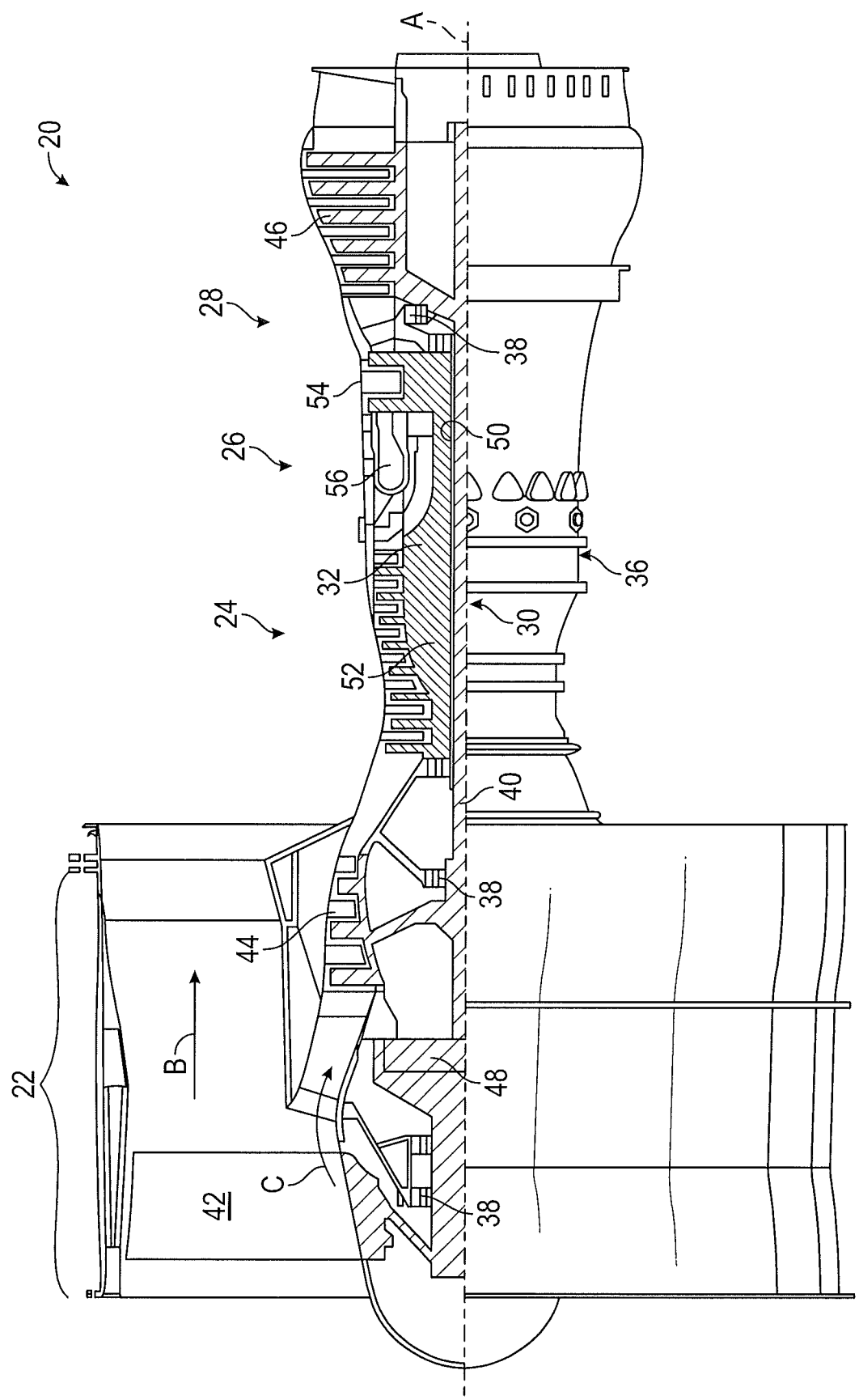
FIG. 1 is a cross-sectional view of an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 m/sec).

Figure 2:
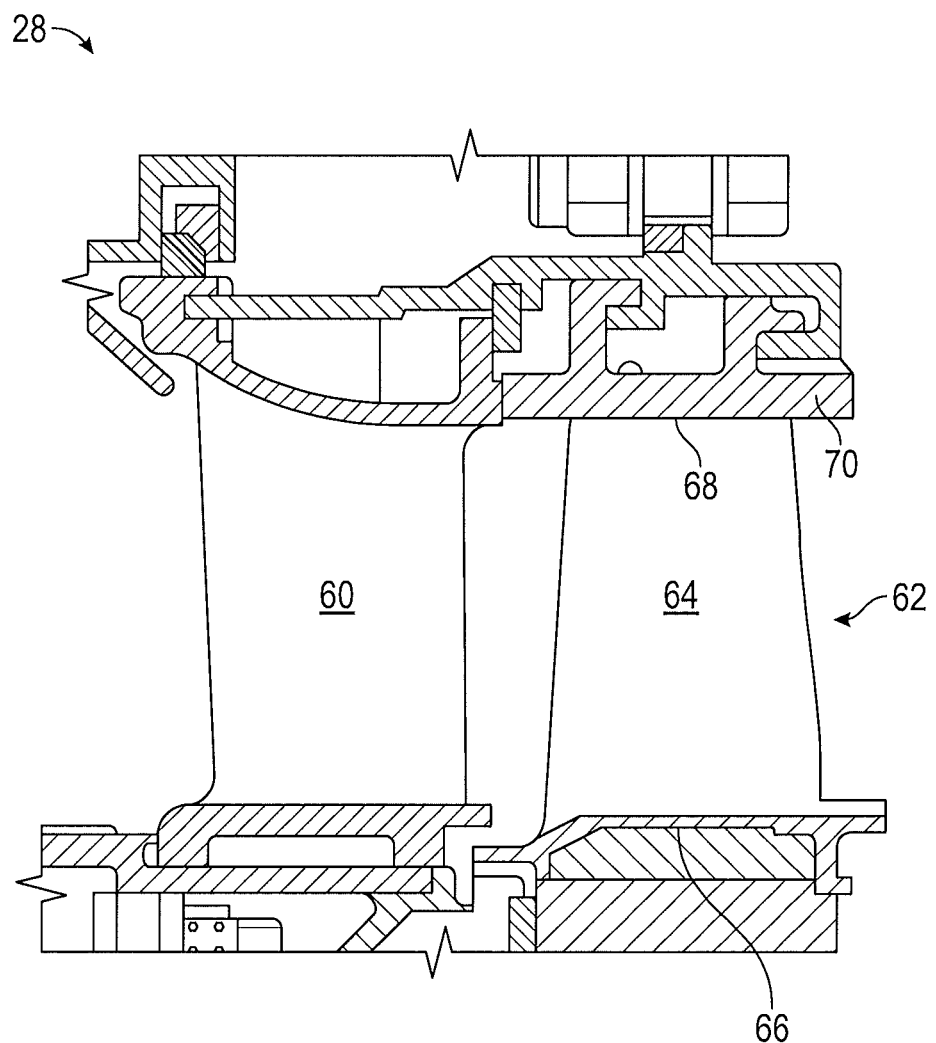
FIG. 2 is a partial cross-sectional view of an embodiment of a turbine section of a gas turbine engine.

Referring now to FIG. 2, the turbine section 28 includes one or more sets, or stages of fixed turbine vanes 60 and turbine rotors 62, each turbine rotor 62 including a plurality of turbine blades 64. The turbine blades 64 extend from a blade platform 66 radially outwardly to a blade tip 68. The blade tip 68 interfaces with a blade outer airseal 70 to maintain minimal operational clearances and thus operational efficiency of the turbine 28. The turbine vanes 60 and the turbine blades 64 utilize internal cooling passages through which a cooling airflow is circulated to maintain the turbine blades 64 and turbine vanes 60 within a desired temperature range. Similarly, other components such as the blade outer airseal 70 may utilize similar cooling channels over which cooling airflow is directed to maintain the component at a desired temperature range, to improve the durability service life of the component.

Figure 3A:
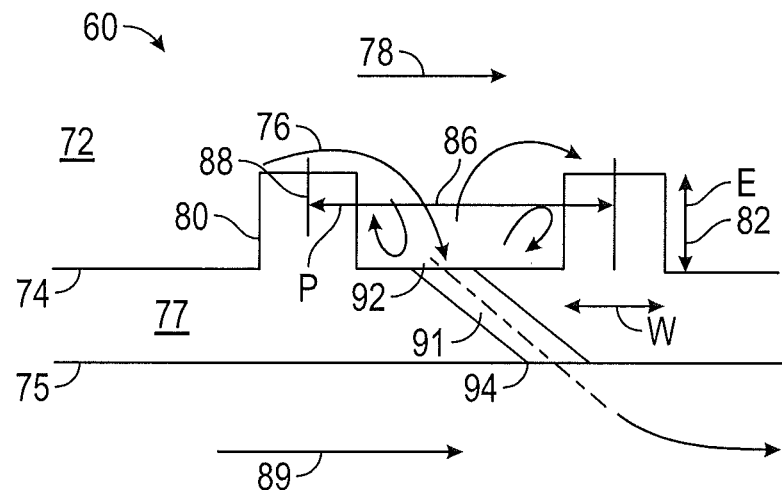
FIG. 3A is a partial cross-sectional view of an embodiment of a component for a gas turbine engine.
Figure 3B:
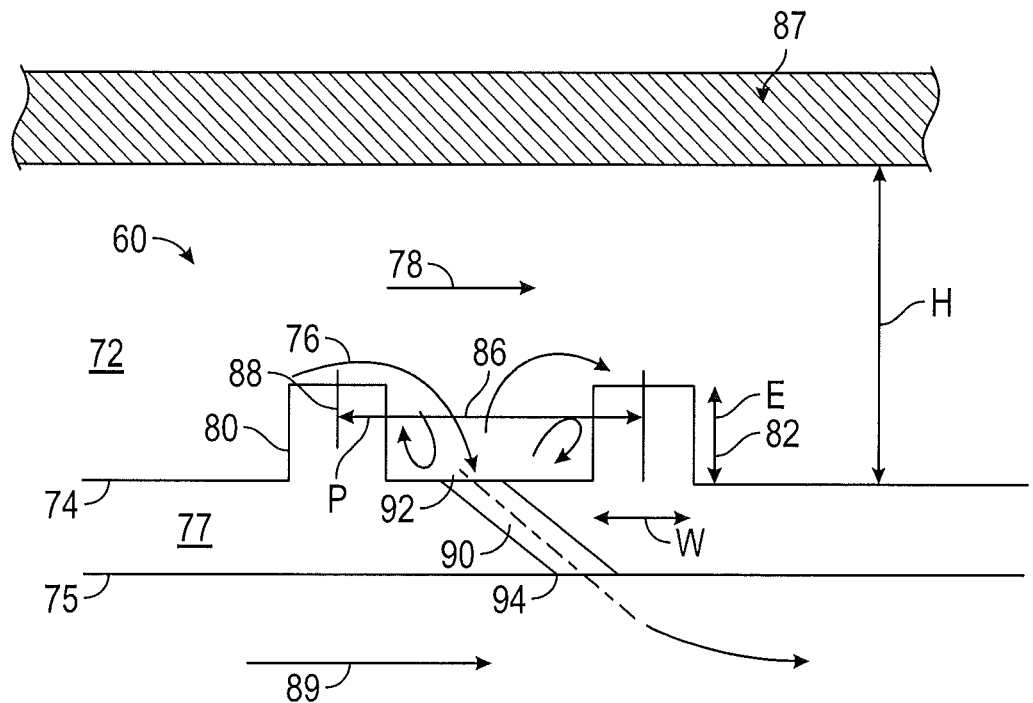
FIG. 3B is another partial cross-sectional view of an embodiment of a component for a gas turbine engine.

Referring now to FIGS. 3A and 3B, shown is a cross-sectional view of an exemplary turbine vane 60. While the description presented herein is in the context of a turbine vane 60, the present disclosure may be readily applied to other components such as turbine blades 64, blade outer airseals 70, inner and outer end walls, combustor panels the like. The turbine vane 60 includes a hot exterior wall 77 defined between an external surface 75 exposed to hot gas path airflow 89, and an internal wall 74 defining an internal cooling passage 72. Cooling airflow 76 flows generally along the internal cooling passage 72 in a flow direction indicated at 78. A plurality of trip strip features 80, also known as turbulators, is arrayed along the internal wall 74.

The trip strip features 80 induce turbulent mixing in the cooling airflow 76 through the internal cooling passage 72 in order to increase the thermal energy transfer between the hot exterior wall 77 and the cooling airflow 76, with the trip strip features 80 spaced along the internal surface 74 to allow for separation and reattachment of the thermal boundary layer of the cooling airflow 76 at the internal surface 74, between adjacent trip strip features 80 spaced at a pitch, (P), in the streamwise direction of the internal cooling flow 76.

The internal coolant flow vortices induced by the trip strip features 80 increase the local internal kinetic energy and turbulent mixing within the thermal boundary layer along the internal surface 74 of the hot exterior wall 77. The reattachment of the "tripped" boundary layer flow locally enhances the convective heat transfer augmentation, thereby generating a significant increase in the local thermal energy transfer from the hot exterior wall 77, to the cooling airflow 76.

The high external heat flux distribution that results from airfoil aerodynamic pressure gradients, boundary layer growth, and increased turbulent mixing is mitigated through the incorporation of low conductivity coatings, nickel based alloys and advanced convective and film cooling design concepts and configurations. As the viscous and thermal boundary layer transitions from a laminar flow regime to fully developed turbulent flow along the external wall surface 75, the external hot gaspath flow 89 and subsequent heat flux convects into the external surface 75 and then conducts thru the hot exterior wall 77. In order to mitigate local high metal temperatures, it becomes necessary to maximize the internal convective cooling by increasing both the coolant wetted surface area and the turbulent mixing along the internal surface 74 of the hot exterior wall 77. Internal trip strip feature 80 geometries are utilized to generate and promote internal vorticity and turbulent mixing in order to maximize the coolant heat transfer augmentation and subsequent heat convection into the internal cooling airflow 76, generating a significant increase in the local thermal cooling effectiveness.

The magnitude of the turbulent length scales and turbulent intensity that results is subject to both geometric and internal flow conditions. The vorticity induced by different trip strip feature 80 orientations and geometries each have unique vortex structures that promote varying levels of heat transfer augmentation and pressure loss. The magnitude and length scale of the separation bubble downstream of a trip strip feature 80 and boundary layer reattachment location is a function of trip strip height (E), trip strip pitch (P) and cavity height (H). Additionally, the local vortex structures produced by each of the trip strip feature 80 geometries are also a function of local cavity Reynolds number, coolant passage shape, cavity aspect ratio, as well as cavity passage orientation, Coriolis effects, and buoyancy effects for rotating airfoil applications will also affect the boundary layer separation and reattachment location as well.

Each trip strip feature 80 has a trip strip height, (E), extending from the internal surface 74 and a trip strip width, (W), extending along the internal surface 74 in the flow direction 78. Further, adjacent trip strip features 80 are separated by a trip strip pitch, (P), along the streamwise flow direction 78. The trip strip pitch, (P), is measured between centers 88 of the adjacent trip strip features 80. In some embodiments, the trip strip feature 80 may have a cross-section aspect ratio of $1 \leq H/W \leq 4$.

In order to increase cooling of the hot exterior wall 77, it is desired to reduce the trip strip pitch (P), in order to maximize the internal "wetted" or convective surface area. One way of achieving this goal is to strategically incorporate film cooling bleed flow between adjacent trip strip features 80 in order to control the region of flow separation that occurs downstream of a trip strip feature 80. By optimally locating film cooling bleed flow, 90, the region of boundary layer separation and reattachment can be controlled. In this sense the film bleed flow mitigates the downstream separation bubble by drawing the "separated" region of coolant flow toward the internal surface of the 74 of the hot exterior wall 77 by leveraging the favorable pressure gradient that exists between the internal cavity pressure and the external airfoil surface static pressure.

To that end, the turbine vane 60 includes a plurality of film cooling bleed holes 90 arrayed along the hot exterior wall 77, and extending through the turbine vane 60 with a film hole inlet 92 at the internal surface 74, and a film hole outlet 94 at the external surface 75. In some embodiments the hot exterior wall 77 defines an airfoil portion of the turbine hot section component similar to vane 60, or rotating blade 64. The film cooling bleed holes 90 are configured to divert a portion of the cooling airflow 76 from the internal cooling passage 72 to form an insulating cooling film along the external hot wall surface 75 to cool and protect the hot exterior wall 77 from the hot external gaspath airflow 89.

In some embodiments, film cooling bleed holes 90 are located between adjacent trip strips 80. The location of the film cooling bleed holes 90 between the adjacent trip strips 80 has the effect of sucking and drawing a portion of the cooling airflow 76 down toward the internal surface 74, in order to reduce the magnitude of the separation bubble downstream of each trip strip feature 80. The location of the film cooling bleed holes 90 downstream of the trip strip feature 80, fluidically promotes the reattachment of the internal cooling boundary layer. With improved reattachment of the boundary layer, the spacing of the trip strip features 80 may be reduced. In some embodiments, a ratio of the trip strip pitch, (P), to the trip strip height (E) is less than 5. In some embodiments, the ratio of the trip strip pitch P and the trip strip height, (E), may be between the following ranges $1 \leq P/E \leq 4$.

Figure 4:
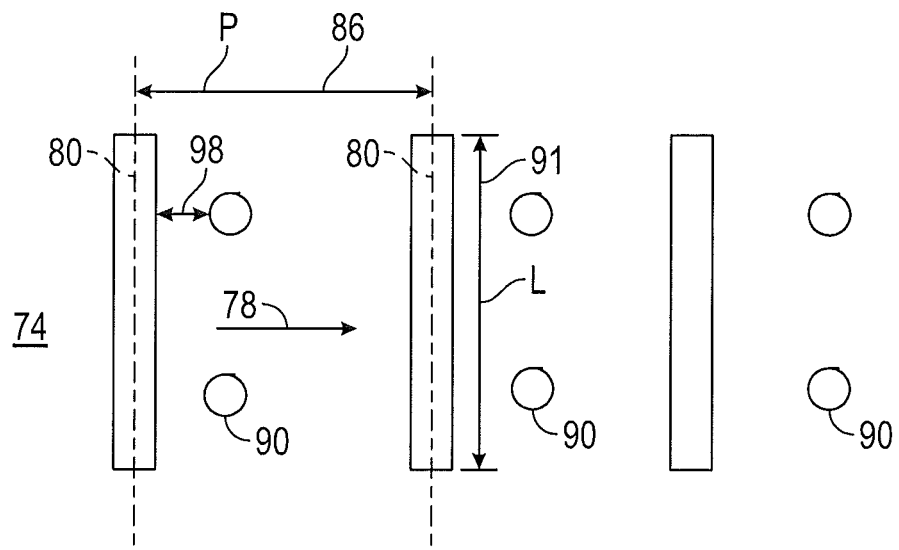
FIG. 4 is a plan view of the embodiment of FIG. 3A.
Figure 5:
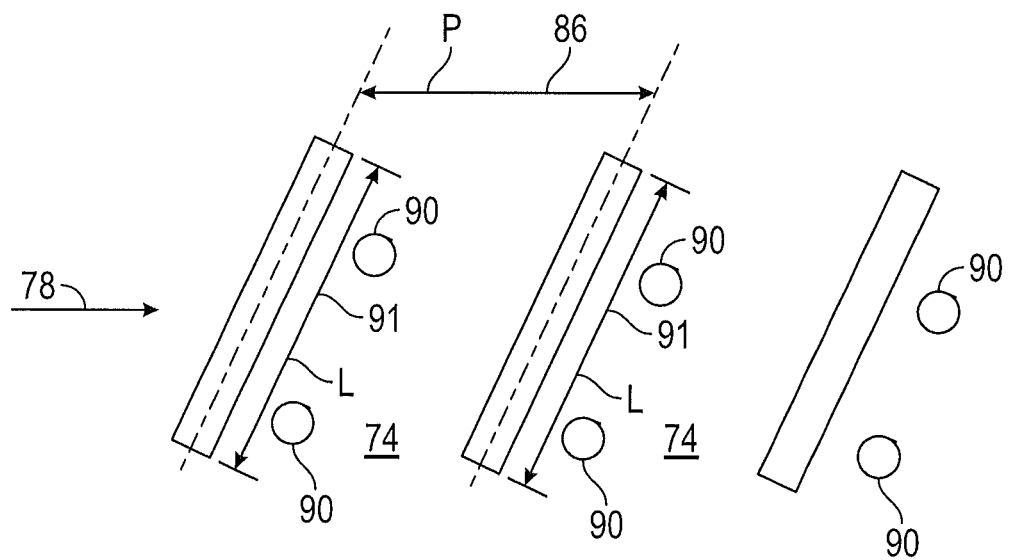
FIG. 5 is a plan view of another embodiment of a component for a gas turbine engine.
Figure 6A:
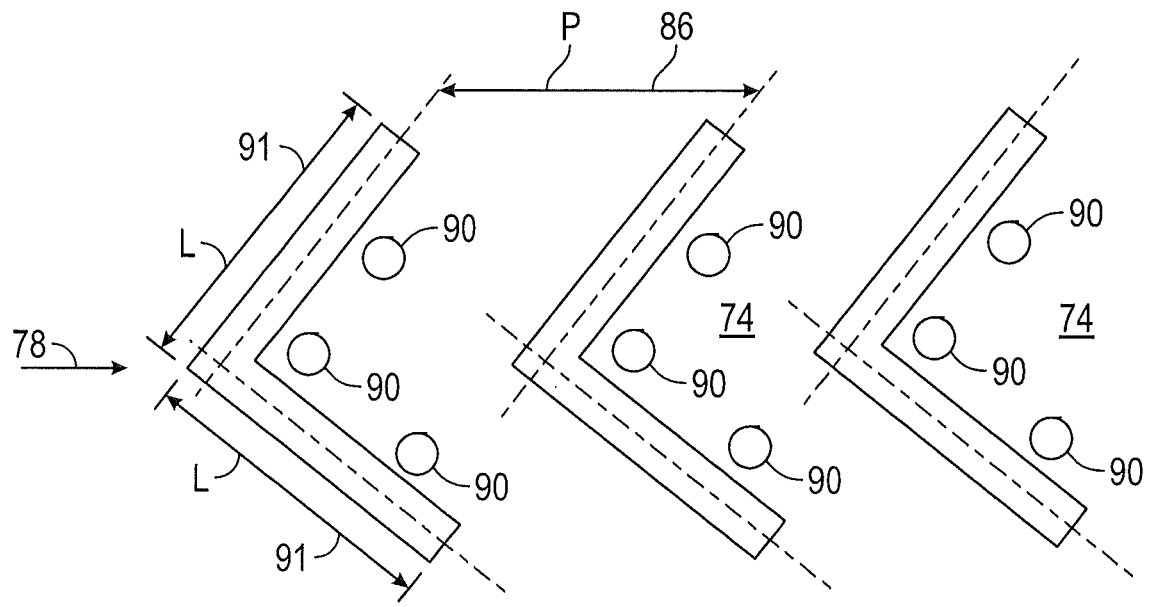
FIG. 6A is a plan view of yet another embodiment of a component for a gas turbine engine.
Figure 6B:
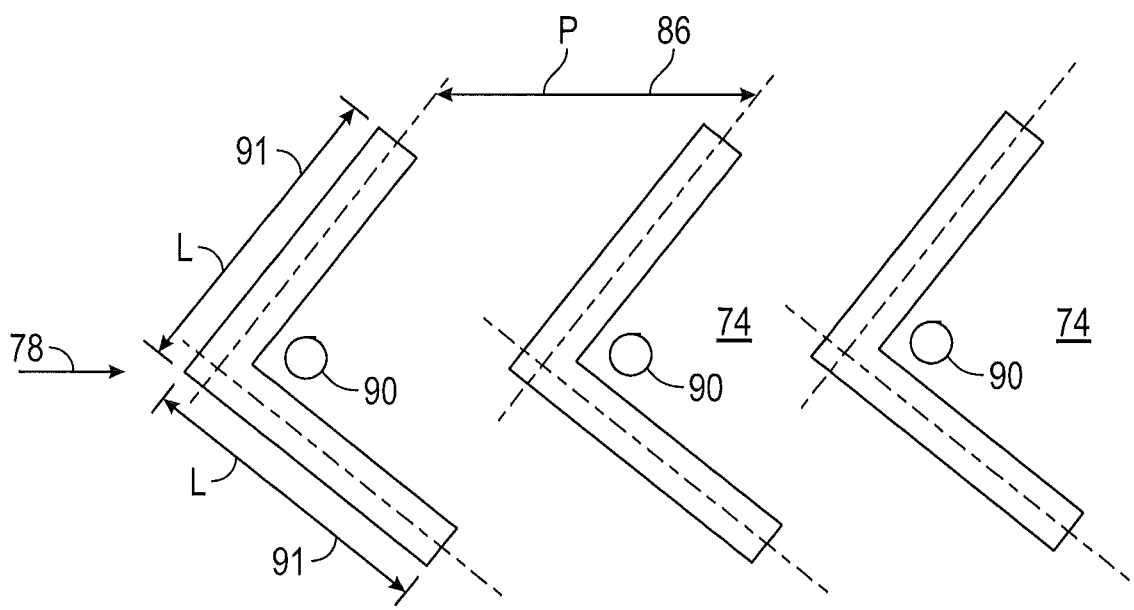
FIG. 6B is a plan view of still another embodiment of a component for a gas turbine engine.

In order to integrate trip strip feature 80 arrays having smaller P/E values ranging between $1 \leq P/E \leq 4$ and produce the necessary flow characteristics of separation and reattachment to occur between adjacent trip strip features 80 it becomes necessary to control the streamwise distance of the separation bubble and reattachment location through the incorporation of film cooling bleed holes 90. The streamwise and lateral location of the film cooling bleed holes 90 along a trip strip feature 80 is dependent on several geometric and fluidic conditions. For example, as illustrated in FIG. 3A, the location/position of the film cooling bleed holes 90 is dependent on the type of trip strip feature 80 geometry configuration, trip strip orientation, trip strip height, (E), cooling passage channel height, (H), cooling passage aspect ratio, and relative streamwise trip strip pitch, (P), being implemented. In some embodiments the opposite wall, 87, of the cooling passage 72 may be a smooth wall, (i.e.—no trip strip features), as illustrated in FIG. 3A, or may also incorporate trip strip features 80, similar to those described and defined within the context of this invention. The trip strip feature 80 configuration types may include, but are not limited to, normal such as shown in FIG. 3 and FIG. 4, but also skewed such as shown in FIG. 5, segmented skewed, chevron as shown in FIGS. 6A and 6B, segmented chevron, W-shaped, segmented W-shaped, as well as, other linear and/or curvilinear trip strip design features known by those skilled in the art.

Additionally the location/position of the film cooling bleed holes 90 is also dependent on the internal cooling airflow 78, and the boundary layer flow condition near the internal wall 74. In particular the location of the film cooling bleed holes 90 is contingent on the local turbulence level, and turbulent length scale of the boundary layer flow regime dependent on local Reynolds number. The thermal and momentum boundary layer vortex structure, shape, size, and magnitude are unique for developing, laminar, transitional, and fully turbulent flow regimes and may influence the relative location and will influence the relative placement of the film cooling bleed holes 90 downstream of the trip strip features 80.

Referring now to FIG. 4, FIG. 5, FIG. 6A and FIG. 6B. The location and relative position of the film cooling bleed holes 90 are referenced from the upstream trip strip feature 80. In this case a cooling hole distance 98 of the film cooling bleed holes 90 from the upstream trip strip feature 80 relative to the trip strip height, (E), may range in relative location anywhere from $0.5 \leq E \leq 3.5$, depending on the streamwise trip strip pitch (P) 86. The position of the film cooling bleed holes 90 along the trip length, (L) may range from $0 \leq L \leq 0.75$ and may be dependent on where the desired boundary layer reattachment location is desired to achieve maximum convective heat transfer between any two adjacent trip strip features 80. Although only one and two film bleed holes 90, are shown it should be understood by those skilled in the art that N-number of film bleed holes may be used depending on cooling flow and cooling passage geometry considerations, as well as convective heat transfer requirements necessary to achieve local durability life requirements. The number of film bleed holes 90 and relative locations along the length of the trip strip features 80 is dependent on the local boundary layer growth, turbulent vorticity, and turbulent length scale, which varies along the length, (L) of the trip strip feature 80.

Figure 7:
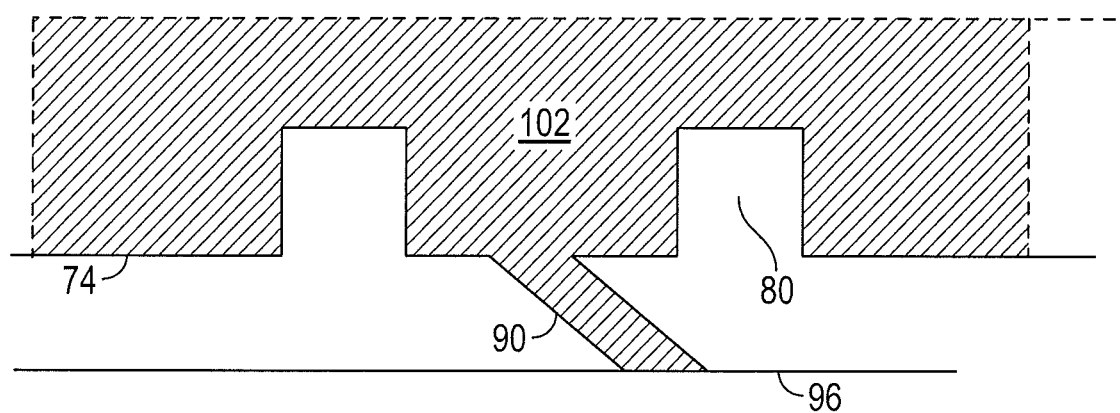
FIG. 7 is a schematic view of a portion of a manufacturing method of a component for a gas turbine engine.

Referring now to FIG. 7, the film cooling bleed holes 90 and the adjacent trip strip features 80 may be formed via a conventional loss wax investment casting process. In some embodiments an integral core body 102 may be fabricated to create both the internal trip strip features 80 and the film cooling bleed holes 90 concurrently using advanced additive manufacturing ceramic core processes and/or fugitive core manufacturing processes that do not require conventional core die tooling. The fabrication of the internal trips strip features 80 and the film cooling bleed holes 90 concurrently using advance additive or fugitive core manufacturing processes and/or fabricated directly from high temperature Inconel, Cobalt Chrome, or Nickel based metal powders using advanced laser powder bed fusion additive manufacturing processes provides increased positional accuracy of the features as well as controlling the relative position of the film cooling bleed holes 90 and the trip strip features 80 compared to a typical process of forming the film cooling bleed holes via a secondary drilling process. The increased positional accuracy of the placement of the trip strip features 80 and the film cooling bleed holes 90 assures a selected amount of cooling airflow 76 is flowed through the film cooling bleed holes 90, while the trip strip pitch, (P), 86 to trip strip height, (E), 82 ratio may be reduced to improve the convective cooling characteristics of the turbine blade and vane airfoils and endwall platforms, as well as, blade outer air seal and combustor panel design concepts incorporating tightly spaced trip strip arrays where the trip strip stream wise pitch, P, and trips strip height, E, has a P/E ratio≤5.

The configurations disclosed herein, with closely-spaced trip strip features 80 improve the convective thermal cooling effectiveness of the cooling airflow 76. Thus, the amount of cooling airflow 76 needed may be reduced without negatively effecting hot section component 60 service life. The reduction in cooling airflow 76 leads to a reduction in thrust-specific fuel consumption (TSFC).

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A component for a gas turbine engine, comprising:
    an external surface bounding a hot gas path of the gas turbine engine;
    a cooling passage configured to deliver a cooling airflow therethrough, including:
        an internal surface located opposite the external surface, the internal surface and the external surface together defining a component wall; and
        a plurality of trip strip features located along the internal surface, each trip strip feature having a trip strip height extending from the internal surface and a trip strip width extending along the internal surface in a flow direction of the cooling airflow through the cooling passage, a ratio of a trip strip pitch between adjacent trip strip features in a width direction and the trip strip height is less than 5; and
    one or more cooling film bleed holes extending from the internal surface to the external surface, the one or more cooling film bleed holes disposed between adjacent trip strip features of the plurality of trip strip features;
    wherein relative to the flow direction, the one or more cooling film bleed holes are located closer to an upstream adjacent trip strip feature that to a downstream adjacent trip strip feature.

2. The component of claim 1, wherein the ratio of trip strip pitch to trip strip height is between 2 and 4.

3. The component of claim 1, wherein a trip strip feature of the plurality of trip strip features has an aspect ratio of trip strip height to trip strip width between 1 and 3.

4. The component of claim 1, wherein the one or more cooling holes are positioned at a cooling hole distance from the upstream adjacent trip strip feature, wherein the cooling hole distance is between 0.5 and 3.5 times the trip strip height.

5. The component of claim 1, wherein the one or more cooling film bleed holes are configured to divert a portion of the cooling airflow therethrough, to form a cooling film at the external surface.

6. The component of claim 1, wherein the component is one of a turbine blade or a turbine vane of a gas turbine engine.

7. The component of claim 1, wherein the component is formed via casting.

8. The component of claim 7, wherein the plurality of trip strip features and the one or more cooling film bleed holes are formed concurrently using additive manufacturing ceramic core processes and/or fugitive core manufacturing processes.

9. A turbine vane for a gas turbine engine, comprising:
    an external surface bounding a hot gas path of the gas turbine engine, the external surface defining an airfoil portion of the vane;
    a cooling passage configured to deliver a cooling airflow therethrough, including:
        an internal surface located opposite the external surface, the internal surface and the external surface together defining a component wall; and
        a plurality of trip strip features located along the internal surface, each trip strip feature having a trip strip height extending from the internal surface and a trip strip width extending along the internal surface in a flow direction of the cooling airflow through the cooling passage, a ratio of a trip strip pitch between adjacent trip strip features in a width direction and the trip strip height is less than 5; and
    one or more cooling film bleed holes extending from the internal surface to the external surface, the one or more cooling film bleed holes disposed between adjacent trip strip features of the plurality of trip strip features;
    wherein relative to the flow direction, the one or more cooling film bleed holes are located closer to an upstream adjacent trip strip feature that to a downstream adjacent trip strip feature.

10. The turbine vane of claim 9, wherein the ratio of trip strip pitch to trip strip height is between 2 and 4.

11. The turbine vane of claim 9, wherein a trip strip feature of the plurality of trip strip features has an aspect ratio of trip strip height to trip strip width between 1 and 3.

12. The turbine vane of claim 9, wherein the one or more cooling holes are positioned at a cooling hole distance from the upstream adjacent trip strip feature, wherein the cooling hole distance is between 0.5 and 3.5 times the trip strip height.

13. The turbine vane of claim 9, wherein the one or more cooling film bleed holes are configured to divert a portion of the cooling airflow therethrough, to form a cooling film at the external surface.

14. The turbine vane of claim 9, wherein the component is formed via casting.

15. The turbine vane of claim 14, wherein the plurality of trip strip features and the one or more cooling film bleed holes are formed concurrently using additive manufacturing ceramic core processes and/or fugitive core manufacturing processes.

16. A gas turbine engine comprising:
a combustor section;
and a turbine section in flow communication with the combustor section; and
one or more components including:
an external surface bounding a hot gas path of the gas turbine engine;
a cooling passage configured to deliver a cooling airflow therethrough, including:
an internal surface located opposite the external surface, the internal surface and the external surface together defining a component wall; and
a plurality of trip strip features located along the internal surface, each trip strip feature having a trip strip height extending from the internal surface and a trip strip width extending along the internal surface in a flow direction of the cooling airflow through the cooling passage, a ratio of a trip strip pitch between adjacent trip strip features in a width direction and the trip strip height is less than 5; and
one or more cooling film bleed holes extending from the internal surface to the external surface, the one or more cooling film bleed holes disposed between adjacent trip strip features of the plurality of trip strip features;
wherein relative to the flow direction, the one or more cooling film bleed holes are located closer to an upstream adjacent trip strip feature that to a downstream adjacent trip strip feature.

17. The gas turbine engine of claim 16, wherein the ratio of trip strip pitch to trip strip height is between 2 and 4.

18. The gas turbine engine of claim 16, wherein a trip strip feature of the plurality of trip strip features has an aspect ratio of trip strip height to trip strip width between 1 and 3.

19. The gas turbine engine of claim 16, wherein the one or more cooling holes are positioned at a cooling hole distance from the upstream adjacent trip strip feature, wherein the cooling hole distance is between 0.5 and 3.5 times the trip strip height.

20. The gas turbine engine of claim 16, wherein the one or more cooling film bleed holes are configured to divert a portion of the cooling airflow therethrough, to form a cooling film at the outer surface.

\* \* \* \* \*